Figure 1:
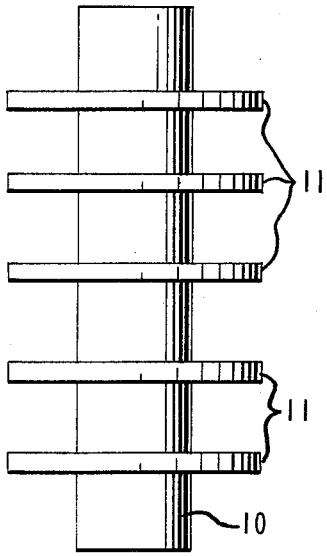
Figure 2:
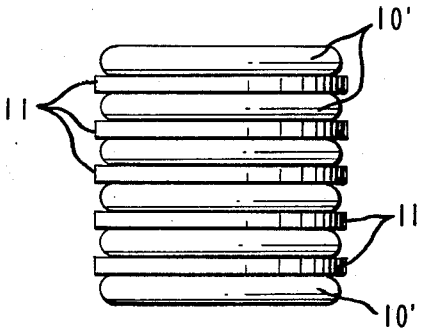
Figure 3:
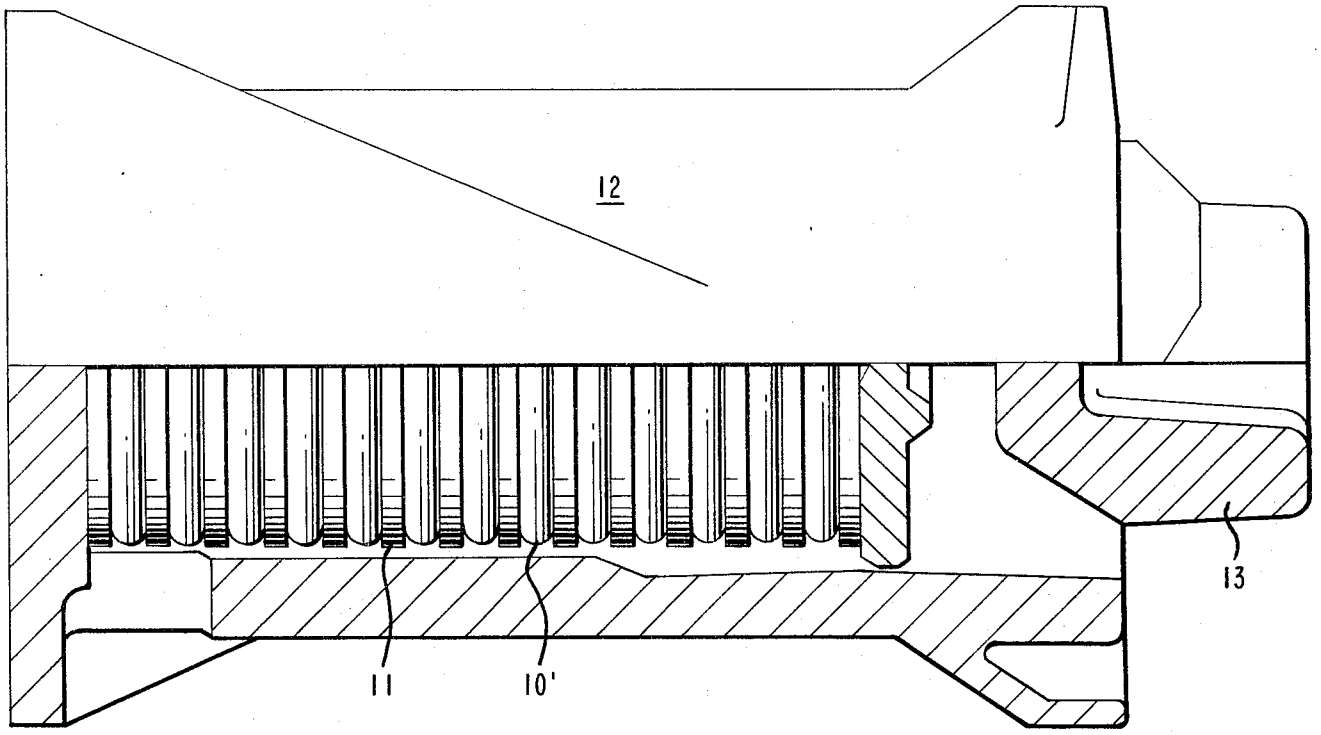

United States Defensive Publication [19] (H) [11] T100,801

Bianca [43] Jul. 7, 1981

[54] ENERGY-ABSORBING DEVICE AND METHOD FOR MAKING SAME

[76] Inventor: Dominick Bianca, 2618 W. Robino Dr., Wilmington, Del. 19808

[21] Appl. No.: 190,960

[22] Filed: Sep. 26, 1980

Related U.S. Application Data

[63] Continuation of Ser. No. 4,483, Jan. 18, 1979, abandoned.

[51] Int. Cl.[3] ..... B29H 3/00; F16F 1/40; F16F 1/44

[52] U.S. Cl. ..... 267/141.1; 213/40 R; 264/261; 264/320; 264/331.21; 29/446; 267/138

[57] ABSTRACT

An energy-absorbing device comprising a permanently shortened member of a thermoplastic elastomer wherein said member comprises circumferentially enlarged portions due to permanent shortening by compression of an elongated member along its longitudinal axis of at least 10% of its original length, the enlarged portions being at least partially oriented and at least one unenlarged portion, and rigid retaining means encircling said unenlarged portion of the shortened thermoplastic elastomer member.

9 Claims, 2 Sheets Drawing,

16 Pages Specification

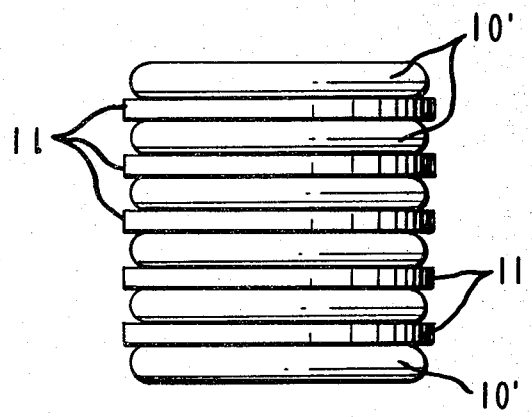

The file of this unexamined application may be inspected and copies thereof may be purchased (849 O.G. 1221, Apr. 9, 1968).